(12) United States Patent
Sankar et al.

(10) Patent No.: US 9,343,929 B2
(45) Date of Patent: May 17, 2016

(54) DUAL MODE WIRELESS POWER RECEIVER

(71) Applicant: WIPQTUS Inc, Cupertino, CA (US)

(72) Inventors: Ganapathy Sankar, Cupertino, CA (US); Manjit Singh, Fremont, CA (US)

(73) Assignee: WIPQTUS INC., Cupertino, CA (US)

( * ) Notice: Subject to any disclaimer, the term of this patent is extended or adjusted under 35 U.S.C. 154(b) by 290 days.

(21) Appl. No.: 13/964,310

(22) Filed: Aug. 12, 2013

(65) Prior Publication Data

US 2014/0159646 A1 Jun. 12, 2014

(51) Int. Cl.

| | |
|---|---|
| H02J 7/00 | (2006.01) |
| H02J 17/00 | (2006.01) |
| H02J 7/02 | (2016.01) |
| H02J 5/00 | (2016.01) |
| H04B 5/00 | (2006.01) |

(52) U.S. Cl.
CPC ............... *H02J 17/00* (2013.01); *H02J 5/005* (2013.01); *H02J 7/025* (2013.01); *H04B 5/0037* (2013.01); *H02J 7/0068* (2013.01)

(58) Field of Classification Search
CPC ........... H02J 7/025; H02J 5/005; H02J 17/00; H02J 7/0004; H02J 7/0027; H02J 7/041; H02J 2007/0001; H02J 2007/0049; H02J 2007/0096; H02J 7/00; H02J 7/007; H02J 7/0047; H02J 7/0052; H02J 7/0068; H02J 13/0024; H02J 13/0062; H02J 13/0075; H02J 13/0082; H02J 13/0089; H02J 9/02; H02J 9/065; H02J 3/1828; G08B 25/08; G08B 25/10
USPC .................................................. 320/105–112
See application file for complete search history.

(56) References Cited

U.S. PATENT DOCUMENTS

| | | | | |
|---|---|---|---|---|
| 2009/0058361 | A1 * | 3/2009 | John ............................ | 320/128 |
| 2011/0115431 | A1 * | 5/2011 | Dunworth et al. ............. | 320/108 |
| 2011/0221388 | A1 * | 9/2011 | Low et al. ..................... | 320/108 |

* cited by examiner

*Primary Examiner* — Binh Tat
(74) *Attorney, Agent, or Firm* — Lipton, Weinberger, Husick; Ash Tankha

(57) ABSTRACT

A dual mode wireless power receiver (DMWPR) selectively applying a received power to a load device and utilizing at least a part of the power to power-up, communicate, and charge a secondary wireless power receiver (SWPR) is provided. The DMWPR includes a first circuitry having an impedance network, a switch network, a filter capacitor, and one or more switches, and a second circuitry having a security engine, a control logic circuit, and a modulator/demodulator circuit. The first circuitry receives power in charging mode and transmits power in communication mode. The second circuitry configures the first circuitry to allow receipt and transmission of power, receives and interprets data from SWPR in the identified wireless power protocol, and based on the type of SWPR authenticates, decrypts, and encrypts data transfer between DMWPR and SWPR, and receives and executes on a request from SWPR to perform a function associated with transmitted power.

11 Claims, 12 Drawing Sheets

DUAL MODE WIRELESS POWER RECEIVER

CROSS REFERENCE TO RELATED APPLICATIONS

This application claims the benefit of provisional patent application No. 61/682,312 titled "Dual Mode Wireless Charging Receiver", filed in the United States Patent and Trademark Office on Aug. 13, 2012.

The specification of the above referenced patent application is incorporated herein by reference in its entirety.

BACKGROUND

When traveling on business or on a vacation, it is very cumbersome to carry the many disparate power adapters for each of the mobile devices. One would rather carry a wireless power pad, if the wireless power pad could charge multiple devices. Such a multi-device charging wireless power pad would certainly be more convenient, however it is an extra piece of luggage that the user would have to remember and carry. It would be even more convenient if mobile devices with big battery capacity such as a notebook, tablet, etc., that typically are carried along on the trips, were able to wirelessly charge other lower battery capacity mobile devices such as a mobile phone, camera, etc., that are also carried on the trips. For example, a notebook's battery capacity would typically be at least 8 times that of a mobile phone's so using the notebook's battery to charge up the mobile phone would not place a heavy drain on the notebook's battery. A mobile device such as notebook, mobile phone, etc., can receive power wirelessly via the wireless power receiver circuitry. To transmit power, the mobile device would need the wireless power transmitter circuitry. It would be ideal if the mobile device's wireless power circuitry could transform into a wireless power receiver or a wireless power transmitter depending on the scenario. In a scenario where the notebook was to be wirelessly charged, its wireless power circuitry should function as a wireless power receiver. In a scenario where the notebook was to wirelessly charge the mobile phone, the notebook's wireless power circuitry should function as a wireless power transmitter.

Consumer electronic device manufacturers are increasingly working on integrating wireless charging and near field communication (NFC) into a mobile device. In today's implementations, wireless charging and NFC are being packaged together but are completely independent of each other. For example, wireless charging coil with its corresponding impedance matching circuitry in the wireless power receiver is completely independent of that of the NFC antenna and its corresponding impedance matching circuitry. Such a parallel approach is too costly particularly for mobile devices catering to the mid and lower tiers of the market. It would be more economical and space conserving if some of the NFC-like functionality were achieved via the wireless charging circuitry itself so for the cost conscious market, the mobile device manufacturers could eliminate the NFC circuitry and yet deliver a very feature rich device with just wireless charging.

To emulate NFC like functionality, in addition to being able to receive power to charging the mobile device's battery, the wireless power receiver circuitry should also be able to transmit power to perform an action or transaction. The actions and transactions are, for example, unlocking a luggage, unlocking a safe, unlocking a computer, virtual wallet, travel-pass for commuter train, boarding pass for flights, etc. These actions and transactions are better served when security features are built into the hardware of the mobile device. If security features are not built into the hardware of the mobile device, the user is dependent on a software application on the mobile device to offer security features. The software application implementations may or may not offer security features and that could compromise sensitive user information. In addition, a very flexible scheme with varying degrees of authentication and encryption would be needed to allow such actions and transactions.

Hence, there is a need for a dual mode wireless power receiver with security features built into the hardware of the mobile device that receives wireless power, in one mode, to charge, for example, a mobile device, transmits power, in another mode, to a secondary wireless power receiver to perform an action or transaction, where such an action or transaction is made inherently secure and reliable via the two-way communication and security capabilities of the dual mode wireless power receiver and in another mode, transforms into a wireless transmitter for charging a secondary wireless power receiver.

SUMMARY OF THE INVENTION

A dual mode wireless power receiver configured to selectively apply a received power to a load device and utilize at least a part of the stored power to power-up and communicate with a secondary wireless power receiver to cause an action or a transaction or charge a load device of the secondary wireless power receiver is provided. The dual mode wireless power receiver comprises a first circuitry and a second circuitry. The first circuitry comprises an impedance network, a switch network, a filter capacitor, and one or more switches. The second circuitry comprises a security engine configured to authenticate, decrypt and encrypt a data transfer between the dual mode wireless power receiver and the secondary wireless power receiver, a control logic circuit, and a modulator/demodulator circuit. The dual mode wireless power receiver can operate in a charging mode and a communication mode. In the charging mode, dual mode wireless power receiver configures the first circuitry to receive the power from an external wireless power transmitter. The first circuitry, based on an input from the control logic circuit is configured to change the impedance of the impedance network and topology of the switch network to obtain a modified form of the received power, and apply the modified form of the power to the load device, for example, a charge management integrated circuit (CMIC), a power management integrated circuit (PMIC), a battery charger, a battery, a capacitor, etc., that consumes or stores or enables the storage of the modified power. In the communication mode, the dual mode wireless power receiver configures the first circuitry, based on an input from the control logic circuit, to change the topology of the switch network and the impedance of the impedance network to transmit a part of the stored power to the secondary wireless power receiver to power-up the secondary wireless power receiver. The second circuitry is configured to identify a type of the secondary wireless power receiver and identify a wireless power protocol of the secondary wireless power receiver. The switch network of the first circuitry is configured as an inverter or a rectifier depending upon the mode of operation of the dual mode wireless power receiver. In the charging mode, the switch network is configured as a rectifier to convert alternating current to direct current (ac-to-dc). In the communication mode, the switch network is configured as an inverter to convert direct current to alternating current (dc-to-ac).

The data exchanged between the dual mode wireless power receiver and the secondary wireless power receiver is a function of secondary wireless power receiver type. When the secondary wireless power receiver powers-up based on the power received from the dual mode wireless power receiver, it communicates its type amongst other information to the dual mode wireless power receiver. Depending on the type of the secondary wireless power receiver, the second circuitry of the dual mode wireless power receiver is configured to send encrypted data to and/or to decrypt the received data from the secondary wireless power receiver. In a first embodiment, when the secondary wireless power receiver is a non-authenticating secondary wireless power receiver, the second circuitry of the dual mode wireless power receiver receives and interprets the data from the non-authenticating secondary wireless power receiver without any authentication or encryption or decryption in a defined sequence as per the identified wireless power protocol. In a second embodiment, when the secondary wireless power receiver is a one-way authenticating secondary wireless power receiver, the second circuitry provides authentication information to the one-way authenticating secondary wireless power receiver to authenticate the dual mode wireless power receiver, receives, decrypts and interprets the data from the one-way authenticating secondary wireless power receiver and responds with suitable encrypted data to the one-way authenticating secondary wireless power receiver in a defined sequence as per the identified wireless power protocol.

In a third embodiment, when the secondary wireless power receiver is a two-way authenticating secondary wireless power receiver, the second circuitry initiates exchange of the authentication information between the dual mode wireless power receiver and the two-way authenticating secondary wireless power receiver to authenticate the dual mode wireless power receiver and the two-way authenticating secondary wireless power receiver, receives, decrypts and interprets data from the two-way authenticating secondary wireless power receiver and responds with suitable encrypted data to the two-way authenticating secondary wireless power receiver in a defined sequence as per the identified wireless power protocol. In a fourth embodiment, when the secondary wireless power receiver is a power sinking secondary wireless power receiver, the second circuitry of the dual mode wireless power receiver receives a request from the power sinking secondary wireless power receiver. The second circuitry interprets the received request and performs a function associated with the transmitted power in conjunction with the first circuitry. For example, the dual mode wireless power receiver interprets the request from the power sinking secondary wireless power receiver to perform a function such as increase the transmitted power, decrease the transmitted power, maintain the transmitted power, turn off the transmitted power, etc and takes action as per the wireless power protocol for such a type of secondary wireless power receiver.

Disclosed herein are also methods for a dual mode wireless power receiver to communicate and receive power from a wireless power transmitter in a charging mode as well as for a dual mode wireless power receiver to deliver power and exchange information with a secondary wireless power receiver in a communication mode. The dual mode wireless power receiver is in the charging mode by default. This means that in idle state, the switch network of the dual mode wireless power receiver is configured as a rectifier to receive power from a wireless power transmitter. On receiving sufficient level of power from the wireless power transmitter, the dual mode wireless power receiver powers up and starts communicating with the wireless power transmitter. The dual mode wireless power receiver adjusts the impedance of its impedance network. The dual mode wireless power receiver also adjusts the topology of the switch network, for example from the default non-synchronous rectifier to fully synchronous rectifier. The dual mode wireless power receiver provides the required information to the wireless power transmitter in the defined sequence as per the norms of the wireless power protocol. The dual mode wireless power receiver establishes a power contract with the wireless power transmitter and then, starts transferring the power to its load device.

The communication mode of the dual mode wireless power receiver is triggered by the user, for example, via a software application, hardware switch, etc. In communication mode, the first circuitry of the dual mode wireless power receiver is configured to change the impedance of the impedance network and change the topology of the switch network to an inverter, for example, a Class D half bridge inverter, Class E half bridge inverter, Class D full bridge inverter, etc., to transmit a part of the stored power to power-up the secondary wireless power receiver. In communication mode, the second circuitry of the dual mode wireless power receiver is configured to identify a type of the secondary wireless power receiver and a wireless power protocol of the secondary wireless power receiver. The valid types of secondary wireless power receiver are non-authenticating, one-way authenticating, two-way authenticating and power sinking. If the type of the secondary wireless power receiver is one of the valid types, the dual mode wireless power receiver maintains power for a predetermined amount of time or until it receives the "end of service" message whichever is the earliest. The dual mode wireless power receiver receives, interprets and records data sent by the secondary wireless power receiver while providing power to the secondary wireless power receiver. The received data is error-checked. If there are errors in the received data, the dual mode wireless power receiver discontinues further transmission of power and after a brief time delay, restarts the process. On receiving an end of service (eos) message or the timeout of a predetermined duration of power transmission time, the dual mode wireless power receiver passes the received data along with a completion code to the software application or mobile device operating system.

Depending on the type of the secondary wireless power receiver, the dual mode wireless power receiver authenticates, decrypts, and encrypts a data transfer between the dual mode wireless power receiver and the secondary wireless power receiver via the identified wireless power protocol. If the secondary wireless power receiver is a non-authenticating secondary wireless power receiver, the dual mode wireless power receiver receives and interprets the data from the secondary wireless power receiver in the identified wireless power protocol without authentication and/or encryption. If the secondary wireless power receiver is a one-way authenticating secondary wireless power receiver, the dual mode wireless power receiver provides authentication information to the one-way authenticating secondary wireless power receiver to enable the authentication of the dual mode wireless power receiver, receives, decrypts and interprets the data from the one-way authenticating secondary wireless power receiver and responds with suitable encrypted data to the one-way authenticating secondary wireless power receiver in the identified wireless power protocol. If the secondary wireless power receiver is a two-way authenticating secondary wireless power receiver, the dual mode wireless power receiver initiates exchange of the authentication information between the dual mode wireless power receiver and the two-way authenticating secondary wireless power receiver to authenticate the dual mode wireless power receiver and the two-way authenticating secondary wireless power receiver, receives, decrypts and interprets the data from the two-way authenticating secondary wireless power receiver and responds with suitable encrypted data to the two-way authenticating secondary wireless power receiver in the identified wireless power protocol. If the secondary wireless power receiver is a power sinking secondary wireless power receiver, the dual mode wireless power receiver on receiving a request from the secondary wireless power receiver, interprets the received request and performs a function associated with the transmitted power. The function performed may include one of increase the transmitted power, decrease the transmitted power, maintain the transmitted power, turn off the transmitted power, etc. The dual mode wireless power receiver takes action as per the wireless power protocol to effectively transmit power to the secondary wireless power receiver.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
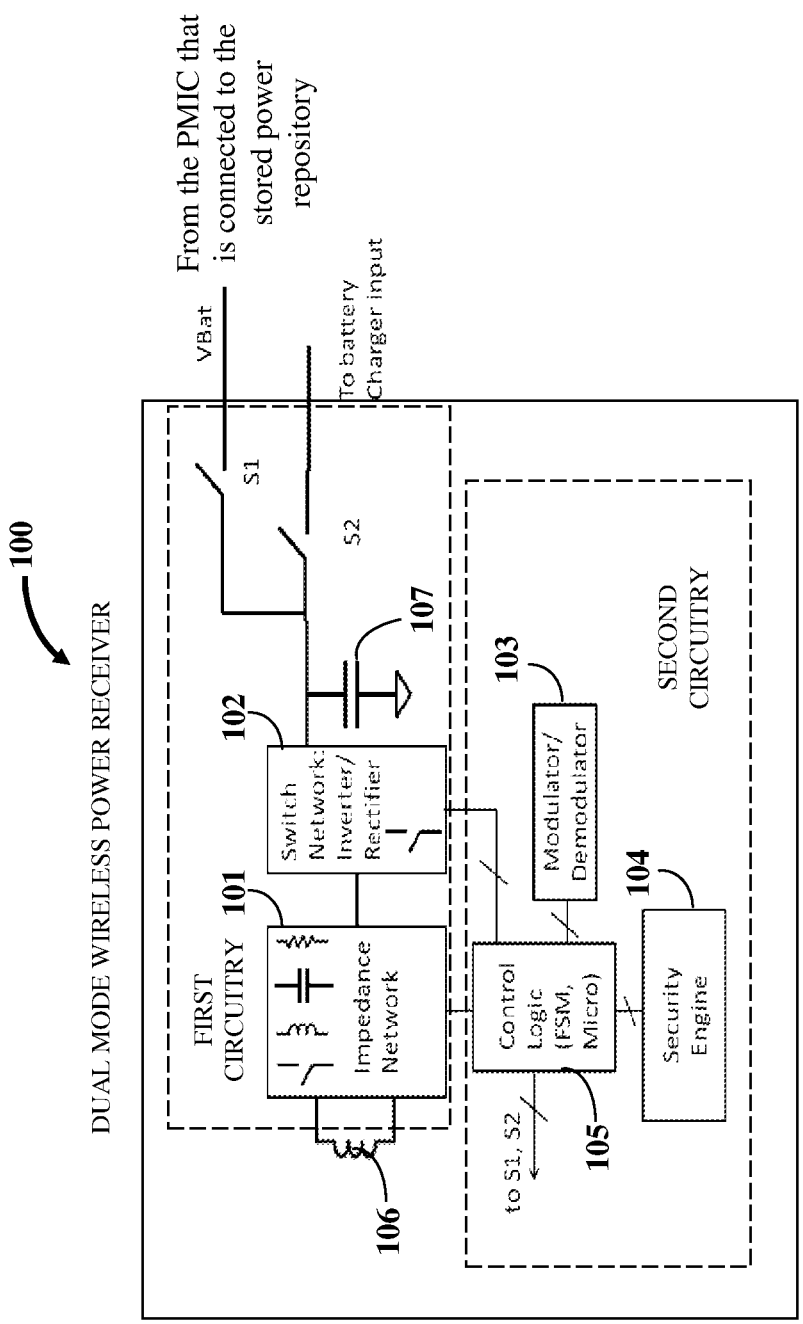
FIG. 1 exemplarily illustrates a schematic diagram of a dual mode wireless power receiver.

FIG. 1 exemplarily illustrates a schematic diagram of a dual mode wireless power receiver 100. The dual mode wireless power receiver 100 is typically integrated into a mobile device, for example, a mobile phone. The dual mode wireless power receiver 100 operates in a charging mode and a communication mode. In charging mode, the dual mode wireless power receiver 100 applies a modified form of received power to a load device. The load device may be, for example, a charge management integrated circuit (CMIC), a power management integrated circuit (PMIC), a battery charger, a battery, a capacitor, etc., that consumes or stores or enables the storage of the modified power. The stored power, for example, as contained in a battery or in a super capacitor, may be augmented in the mobile device by other means. The dual mode wireless power receiver 100 typically accesses the stored power via the PMIC. In communication mode, the dual mode wireless power receiver 100 provides a part of the stored power to a secondary wireless power receiver 300 exemplarily illustrated in FIG. 3, to enable the secondary wireless power receiver 300 to power up and start communicating with the dual mode wireless power receiver 100.

The dual mode wireless power receiver 100 comprises a first circuitry and a second circuitry. The first circuitry and the second circuitry operate in charging mode on power-up. In the charging mode, the first circuitry receives power from a wireless power transmitter 200 exemplarily illustrated in FIG. 2A, and applies that power to the load device, for example, a charge management integrated circuit (CMIC) or a power management integrated circuit (PMIC), a battery charger, a battery, a resistive load, etc. The first circuitry comprises an impedance network 101, a switch network 102, a filter capacitor 107, and switches S1 and S2. As exemplarily illustrated in FIG. 5A, in the charging mode, the switch network 102 of the first circuitry is configured as a rectifier; switch S1 is open and switch S2 is closed to direct the rectified and filtered power to the load device. The second circuitry comprises a control logic circuit 105, a security engine 104, and a modulator/demodulator circuit 103. In the charging mode, the second circuitry communicates with the wireless power transmitter 200 to regulate the amount of power that it receives as per the norms of the implemented wireless power protocol.

In the communication mode, the switch network 102 of the first circuitry is configured as an inverter, transforming the dual mode wireless power receiver 100 into a wireless power transmitter for transmitting power to a secondary wireless power receiver 300. As exemplarily illustrated in FIG. 5B, in the communication mode, switch S1 is closed and switch S2 is kept open to direct the power from the battery via the inverter to one of a coil and capacitor electrodes (active and passive electrodes). The coil or the capacitor electrodes are used to wirelessly transmit the battery power of the dual mode wireless power receiver 100 to the secondary wireless power receiver 300 via a magnetic field or an electric field. In the communication mode, when the secondary wireless power receiver 300 powers-up based on the power received from the dual mode wireless power receiver 100, the secondary wireless power receiver 300 communicates its type amongst other information. In the communication mode, the second circuitry of the dual mode wireless power receiver 100 interprets the communicated information received from the secondary wireless power receiver 300. On detection of the secondary wireless power receiver type, the second circuitry automatically adapts to the wireless power protocol based on the type of the secondary wireless power receiver 300.

The impedance network 101 comprises one or more of passive electronic components, for example, a resistor, a capacitor, a magnetic device, a transducer, transformer etc.; active electronic components, for example, a diode, a transistor such as a metal oxide semiconductor field effect transistor (MOSFET), a bipolar transistor, etc., operational amplifiers, an optoelectronic device, etc., and electronic switches. These electronic components in combination are utilized to vary impedance of the dual mode wireless power receiver 100 prior to transmitting power to a secondary wireless power receiver 300.

The control logic circuit 105 is, for example, a state machine, a microcontroller, etc. In charging mode, the control logic circuit 105 is configured to receive a pulse width modulated (PWM) signal from the first circuitry and provide/receive a digital signal to and from the modulator/demodulator circuit 103 for the communication link that exists between the dual mode wireless power receiver 100 and the wireless power transmitter 200. In communication mode, the control logic circuit 105 is configured to provide a pulse width modulated (PWM) signal to the first circuitry and provide/receive a digital signal to and from the modulator/demodulator circuit 103 for the communication link that exists between the dual mode wireless power receiver 100 and the secondary wireless power receiver 300.

The security engine 104 contains authentication, encryption and decryption functions ensuring that the data exchange between the dual mode wireless power receiver 100 and the secondary wireless power receiver 300 is secure. The security engine 104 is configured to authenticate the secondary wireless power receiver 300, decrypt and encrypt a data transfer between the dual mode wireless power receiver 100 and the secondary wireless power receiver 300 as per the identified wireless power protocol based on the type of the secondary wireless power receiver 300. The authentication process may be one-way or mutual depending on the type of secondary wireless power receiver 300.

The second circuitry enables the dual mode wireless power receiver 100 to have either a one-way or a two-way communication with the secondary wireless power receiver 300, based on the type and capabilities of the secondary wireless power receiver 300. The second circuitry also enables the dual mode wireless power receiver 100 to have either a one-way or a two-way communication with the wireless power transmitter 200. Based on the secondary wireless power receiver 300, the second circuitry is configured to perform one of (a) receive and interpret the data from the secondary wireless power receiver 300 in the identified wireless power protocol; (b) provide authentication information to the secondary wireless power receiver 300 to authenticate the dual mode wireless power receiver 100, receive, decrypt and interpret the data from the secondary wireless power receiver 300 and respond with suitable encrypted data to the secondary wireless power receiver 300 in the identified wireless power protocol; (c) initiate exchange of the authentication information between the dual mode wireless power receiver 100 and the secondary wireless power receiver 300 to authenticate the dual mode wireless power receiver 100 and the secondary wireless power receiver 300, receive, decrypt and interpret the data from the secondary wireless power receiver 300 and respond with suitable encrypted data to the secondary wireless power receiver 300 in the identified wireless power protocol; or (d) receive a request from the secondary wireless power receiver 300, interpret the request and perform a function associated with the transmitted power, in conjunction with the first circuitry. The functions performed may include one of increase the transmitted power, decrease the transmitted power, maintain the transmitted power, turn off the transmitted power, etc., and takes action as per the wireless power protocol for such a type of secondary wireless power receiver 300.

Figure 2A:
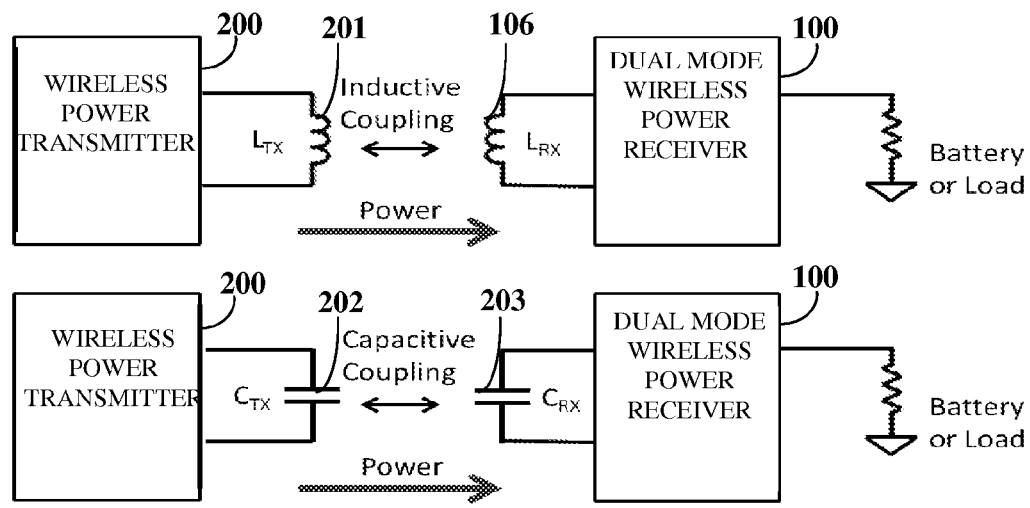
FIG. 2A exemplarily illustrates a schematic diagram of a wireless power system, wherein a wireless power transmitter transmits wireless power to the dual mode wireless power receiver through a magnetic field using inductive coupling and through a electric field using capacitive coupling.

FIG. 2A exemplarily illustrates a schematic diagram of a wireless power system, wherein a wireless power transmitter 200 transmits wireless power to the dual mode wireless power receiver 100 through a magnetic field using inductive coupling or through an electric field using capacitive coupling. In FIG. 2A, the wireless power transmitted to the dual mode wireless power receiver 100 is magnetic field based or electric field based using inductive coupling or capacitive coupling respectively. The transmitter coil 201 of the wireless power transmitter 200 is configured to wirelessly transmit power to the dual mode wireless power receiver 100. The transmitter coil 201 is used for inducing a magnetic field to a coupling region for providing energy transfer to the dual mode wireless power receiver 100. The wireless power transmitter 200 transmits power to the dual mode wireless power receiver 100 by emanating the magnetic field using the transmitter coil 201. The dual mode wireless power receiver 100 comprises a receiver coil 106 that picks up the magnetic field based of a magnetic field coupling that exists between the transmitter coil 201 and the receiver coil 106.

The wireless power transmitted to the dual mode wireless power receiver 100 is electric field based using capacitive coupling existing between the capacitor electrodes 202 of the wireless power transmitter 200 and the capacitor electrodes 203 of the dual mode wireless power receiver 100. The capacitor electrodes 202 of the wireless power transmitter 200 are configured to wirelessly transmit power to the dual mode wireless power receiver 100. The capacitor electrodes 202 are used for inducing an electric field to a coupling region for providing energy transfer to the dual mode wireless power receiver 100. The wireless power transmitter 200 transmits power to the dual mode wireless power receiver 100 by emanating the electric field using the capacitor electrodes 202. The capacitor electrodes 203 of the dual mode wireless power receiver 100 picks up the electric field based of an electric field coupling that exists between the capacitor electrodes 202 of the wireless power transmitter 200 and the capacitor electrodes 203 of the dual mode wireless power receiver 100.

Figure 2B:
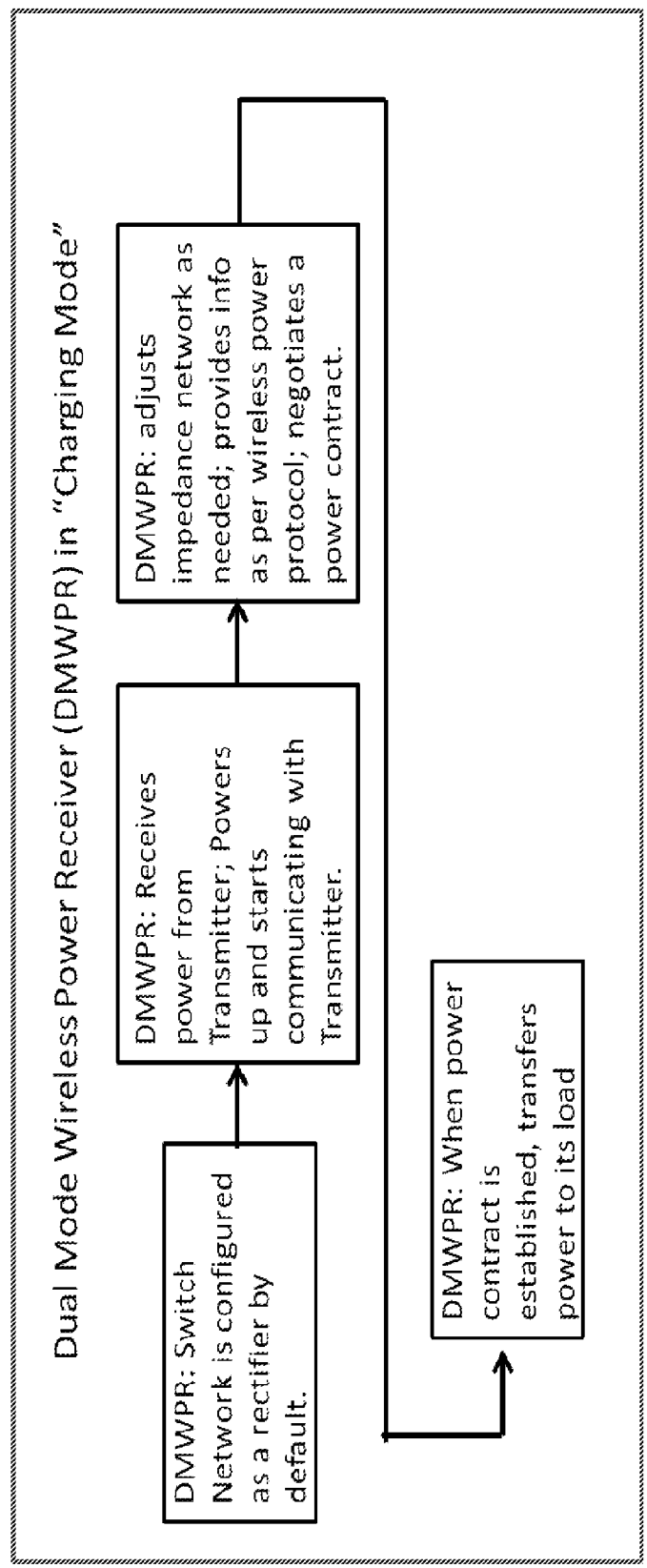
FIG. 2B exemplarily illustrates a flow diagram showing the operation of the dual mode wireless power receiver in a charging mode.

FIG. 2B exemplarily illustrates a flow diagram showing the operation of the dual mode wireless power receiver 100 exemplarily illustrated in FIG. 2A, in the charging mode. The dual mode wireless power receiver 100 is in the charging mode by default. This means that in idle state, the switch network 102 of the dual mode wireless power receiver 100 is configured as a rectifier to receive power from a wireless power transmitter 200 exemplarily illustrated in FIG. 2A. In the charging mode, the dual mode wireless power receiver 100 charges a load device that is connected to it. In the charging mode, switch S2 is closed and switch S1 is open to direct the rectified and filtered power to the load device. On receiving sufficient level of power from the wireless power transmitter 200, the dual mode wireless power receiver 100 powers up and starts communicating with the wireless power transmitter 200. Depending on the type of wireless power transmitter 200, the control logic circuit 105 adjusts the impedance of the impedance network 101 of the first circuitry. Depending on the level of wireless power being received, the control logic circuit 105 adjusts the topology of the switch network 102 of the first circuitry. Via the second circuitry, the dual mode wireless power receiver 100 provides the required information to the wireless power transmitter 200 in the defined sequence as per the norms of the wireless power protocol. The dual mode wireless power receiver 100 establishes a power contract with the wireless power transmitter 200 and the dual mode wireless power receiver 100 starts transferring the power to its load device.

Figure 3:
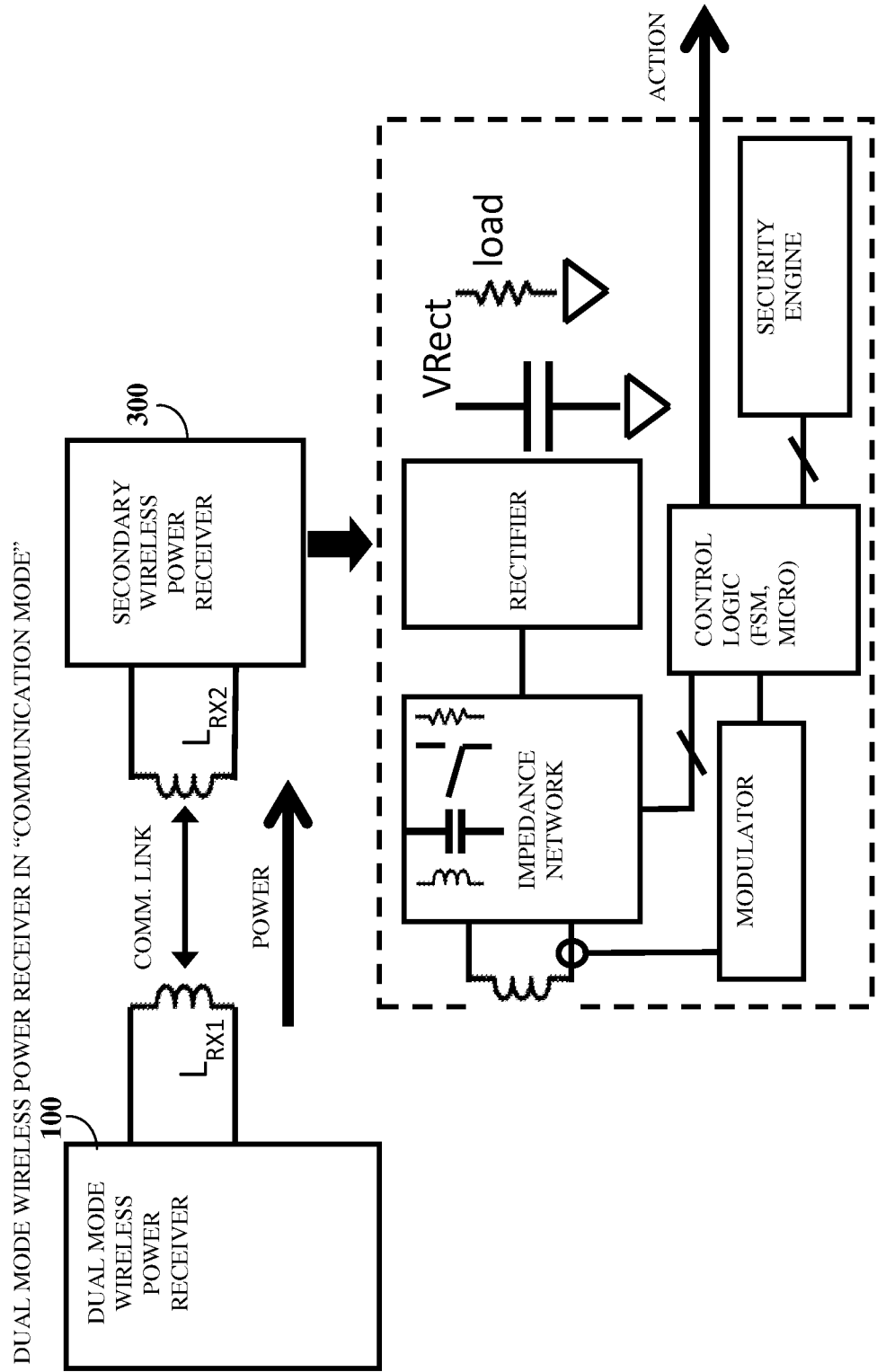
FIG. 3 exemplarily illustrates a schematic diagram showing the operation of the dual mode wireless power receiver in a communication mode, wherein the dual mode wireless power receiver is in communication with a secondary wireless power receiver.

FIG. 3 exemplarily illustrates a schematic diagram showing the operation of the dual mode wireless power receiver 100 in the communication mode, wherein the dual mode wireless power receiver 100 as disclosed in the detailed description of FIG. 1 is in communication with a secondary wireless power receiver 300. In the communication mode, switch S1 is closed and switch S2 is open to direct, for example, a battery's power via the switch network 102 to a coil or capacitor electrodes and emanate power via a magnetic field or an electric field, respectively. In the communication mode, the dual mode wireless power receiver 100 provides power to the secondary wireless power receiver 300 to enable the secondary wireless power receiver 300 to power up and start communicating as disclosed in the detailed description of FIGS. 4A-4D with the dual mode wireless power receiver 100. The dual mode wireless power receiver 100 configures the switch network 102 of the first circuitry, as an inverter in the communication mode, transforming the dual mode wireless power receiver 100 into a wireless power transmitter for transmitting power to the secondary wireless power receiver 300.

FIGS. 4A-4D exemplarily illustrate flow diagrams showing the operation of the dual mode wireless power receiver 100 exemplarily illustrated in FIG. 1, in communication with a non-authenticating secondary wireless power receiver 300, a one-way authenticating secondary wireless power receiver 300, a two-way authenticating secondary wireless power receiver 300, and a power sinking secondary wireless power receiver 300 exemplarily illustrated in FIG. 3, respectively.

Figure 4A:
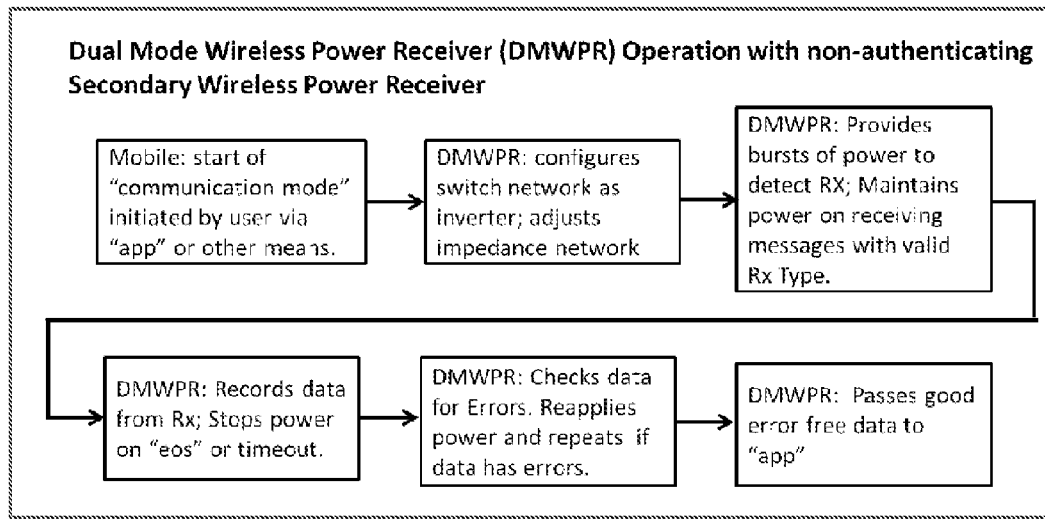
FIGS. 4A-4D exemplarily illustrate flow diagrams showing the operation of the dual mode wireless power receiver in communication with a non-authenticating secondary wireless power receiver, a one-way authenticating secondary wireless power receiver, a two-way authenticating secondary wireless power receiver, and a power sinking secondary wireless power receiver respectively.

FIG. 4A exemplarily illustrates a flow diagram showing the operation of the dual mode wireless power receiver 100 in communication with a non-authenticating secondary wireless power receiver 300. The information exchanged between the secondary wireless power receiver 300 and the dual mode wireless power receiver 100 is a function of the secondary wireless power receiver type. A non-authenticating secondary wireless power receiver 300 is used for applications such as a product advertisement in a retail store, a show promotion via a poster, etc. In these applications, the secondary wireless power receiver 300 used would be very undemanding. The secondary wireless power receiver 300 broadcasts its embedded information such as a product specific code, manufacturer code, website address, etc., which is recorded by the dual mode wireless power receiver 100. The secondary wireless power receiver 300 is a non-authenticating type of device, that is, the secondary wireless power receiver 300 does not seek to discover the identity of the dual mode wireless power receiver 100. The communication link established from the secondary wireless power receiver 300 to the dual mode wireless power receiver 100 is one-way and the secondary wireless power receiver 300 lacks the intelligence to perform any dual mode wireless power receiver 100 requested services.

The dual mode wireless power receiver 100 is instructed to enter "communication mode" and provide power by a software application that is resident and executing on a mobile device of the dual mode wireless power receiver 100. In an embodiment, the dual mode wireless power receiver 100 is instructed to enter "communication mode" and provide power by an external switch such as a hardware switch. When the hardware switch is externally toggled, the dual mode wireless power receiver 100 enters "communication mode". In communication mode, the first circuitry of the dual mode wireless power receiver 100 is configured to change the impedance of the impedance network 101 and change the topology of the switch network 102 to transmit a part of the stored power to the secondary wireless power receiver 300 to power-up the secondary wireless power receiver 300. The stored power is, for example, contained in a battery, capacitor, etc., and is provided to the dual mode wireless power receiver 100 by a PMIC. In communication mode, the second circuitry of the dual mode wireless power receiver 100 is configured to identify a type of the secondary wireless power receiver 300.

On receiving sufficient level of power, the secondary wireless power receiver 300 powers up and starts communicating. When a communication message is received, the dual mode wireless power receiver 100 identifies that the secondary wireless power receiver 300 is a non-authenticating secondary wireless power receiver type. The second circuitry of the dual mode wireless power receiver 100 configures itself suitably to handle the non-authenticating secondary wireless power receiver type. The dual mode wireless power receiver 100 maintains power until a predetermined amount of time or until it receives the "end of service" message whichever is the earliest. The dual mode wireless power receiver 100 receives, interprets and records data sent by the secondary wireless power receiver 300 while providing power to the secondary wireless power receiver 300. The received data is error-checked. If there are errors in the received data, the dual mode wireless power receiver 100 discontinues further the transmission of power and after a brief delay, restarts the process. If the data is error-free, it is passed to the software application. The software application disassembles the information and performs data specific functions, for example, routes the data to a website, retrieves and displays product specific content such as its price, ingredients, nutrient value, etc., entertainment poster specific content such as show times, locations, reviews, etc., and anything else as triggered by the data from secondary wireless power receiver 300.

The non-authenticating secondary wireless power receiver 300 draws power only for communication with the dual mode wireless power receiver 100, that is, power is not drawn for charging, for example, a battery, a capacitor, other loads, etc. As a result, the power drain on the dual mode wireless power receiver 100 is minimal.

Figure 4B:
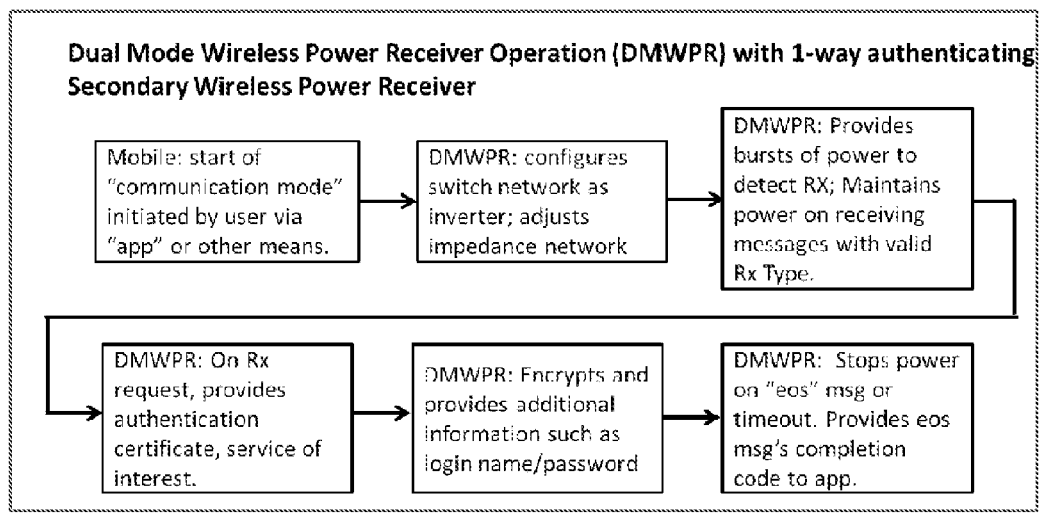

FIG. 4B exemplarily illustrates a flow diagram showing the operation of the dual mode wireless power receiver 100 in communication with a one-way authenticating secondary wireless power receiver 300. The secondary wireless power receiver 300 is a one-way authenticating type of device, that is, a source authenticating type of device. As described previously, the dual mode wireless power receiver 100 is instructed to enter "communication mode" and provide power by a software application that is resident and executing on a mobile device of the dual mode wireless power receiver 100, a hardware switch on a mobile device of the dual mode wireless power receiver 100 that is externally toggled, etc. In communication mode, the first circuitry of the dual mode wireless power receiver 100 is configured to change the impedance of the impedance network 101 and change the topology of the switch network 102 to transmit a part of the stored power to the secondary wireless power receiver 300 to power-up the secondary wireless power receiver 300. The stored power is, for example, contained in a battery, a capacitor, etc., and is provided to the dual mode wireless power receiver 100 by a PMIC. In communication mode, the second circuitry of the dual mode wireless power receiver 100 is configured to identify a type of the secondary wireless power receiver 300. When the secondary wireless power receiver 300 is a one-way authenticating type of device, the dual mode wireless power receiver 100 configures the security engine 104 of the second circuitry to authenticate, decrypt and encrypt a data transfer between the dual mode wireless power receiver 100 and the secondary wireless power receiver 300 and respond with suitable encrypted data to the secondary wireless power receiver 300 via the identified wireless power protocol.

On receiving sufficient level of power, the secondary wireless power receiver 300 powers up and starts communicating. When a communication message is received, the dual mode wireless power receiver 100 identifies that the secondary wireless power receiver 300 is a one-way authenticating secondary wireless power receiver type. The second circuitry of the dual mode wireless power receiver 100 configures itself suitably to handle the one-way authenticating secondary wireless power receiver type. The dual mode wireless power receiver 100 maintains power until a predetermined amount of time or until it receives the "end of service" message whichever is the earliest. After providing its type and other information, the secondary wireless power receiver 300 requests authentication information from the dual mode wireless power receiver 100. The dual mode wireless power receiver 100 provides its specific authentication information in the defined sequence as per the wireless power protocol. In an embodiment, the dual mode wireless power receiver 100 generates the authentication information in conjunction with the software application. Based on the authentication information provided by the dual mode wireless power receiver 100, if the dual mode wireless power receiver 100 is recognized as a known trusted source, then the secondary wireless power receiver 300 requests the dual mode wireless power receiver 100 of the service to be performed. The dual mode wireless power receiver 100 provides the service of interest as supplied by the software application. The software application may provide additional information such as login and password information as may be relevant when the service is for example, unlocking a computer. The dual mode wireless power receiver 100 provides all this additional information to the secondary wireless power receiver 300 in the defined sequence as per the wireless power protocol.

The secondary wireless power receiver 300 receives and interprets the requested service and if the dual mode wireless power receiver 100 is authorized for such a service, the secondary wireless power receiver 300 performs the requested service. The secondary wireless power receiver 300 then responds back with an "end of service" message containing, for example, a "done" completion code in the message. If the dual mode wireless power receiver 100 fails authentication, that is, the dual mode wireless power receiver 100 is not a trusted source or if not authorized for the requested service or if the additional information such as login and password were not to match, the secondary wireless power receiver 300 sends an "end of service" message containing, an "error" completion code in the message. The dual mode wireless power receiver 100 receives, interprets and records data sent by the secondary wireless power receiver 300 while providing power to the secondary wireless power receiver 300. The received data is error-checked. If there are errors in the received data, the dual mode wireless power receiver 100 discontinues further the transmission of power and after a brief delay, restarts the process. If the data is error-free, it is passed to the software application. The power drawn from the dual mode wireless power receiver 100 by the secondary wireless power receiver 300 is only for two-way communication. As a result, the power drain on the dual mode wireless power receiver 100 is minimal.

Figure 4C:
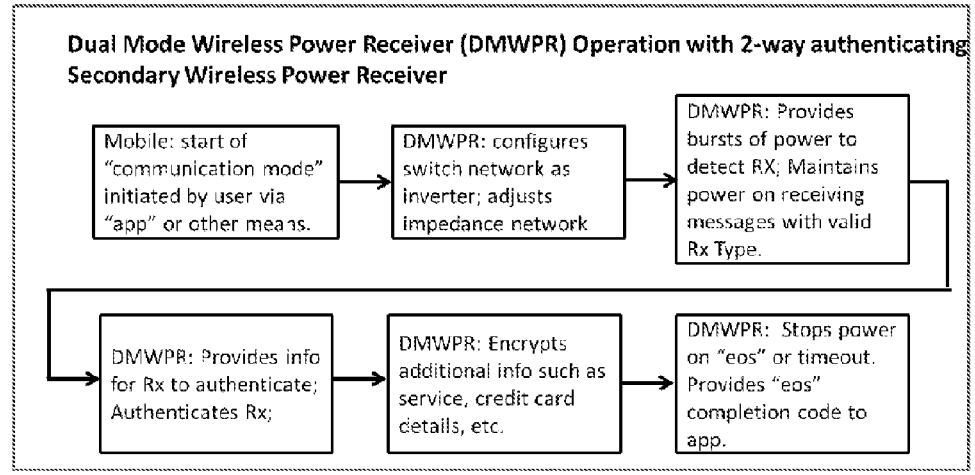

FIG. 4C exemplarily illustrates a flow diagram showing the operation of the dual mode wireless power receiver 100 in communication with a two-way authenticating secondary wireless power receiver 300. The operation of the dual mode wireless power receiver 100 in communication with a two-way authenticating secondary wireless power receiver 300 is identical to the operation of the dual mode wireless power receiver 100 in communication with a one-way authenticating secondary wireless power receiver 300 except for one additional element. The operation of the dual mode wireless power receiver 100 in communication with a one-way authenticating secondary wireless power receiver 300 is disclosed in the detailed description of FIG. 4B. The operation of the dual mode wireless power receiver 100 in communication with a two-way authenticating secondary wireless power receiver 300 encompasses all of that and in addition, the dual mode wireless power receiver 100 authenticates the secondary wireless power receiver 300. On power-up, the secondary wireless power receiver 300 provides its type and other information and requests authentication information from the dual mode wireless power receiver 100. The dual mode wireless power receiver 100 provides its specific authentication information in the defined sequence as per the wireless power protocol. After providing its authentication information, the dual mode wireless power receiver 100 requests authentication information from the secondary wireless power receiver 300. Based on the authentication information provided by the secondary wireless power receiver 300, if the secondary wireless power receiver 300 is recognized as a known trusted source, then the dual mode wireless power receiver 100 continues providing power and executes further as disclosed in the detailed description of FIG. 4B. If the secondary wireless power receiver 300 is not recognized as a known trusted source, then the dual mode wireless power receiver 100 discontinues providing further power to the secondary wireless power receiver 300 and terminates the operation with appropriate error code passed onto the software application for user notification.

Based on a communication message, when the secondary wireless power receiver 300 is recognized to be of the two-way authenticating type, the dual mode wireless power receiver 100 configures the security engine 104 of the second circuitry to authenticate, decrypt and encrypt a data transfer between the dual mode wireless power receiver 100 and the secondary wireless power receiver 300 via the identified wireless power protocol. The second circuitry of the dual mode wireless power receiver 100 initiates exchange of the authentication information between the dual mode wireless power receiver 100 and the secondary wireless power receiver 300, to authenticate the dual mode wireless power receiver 100 and the secondary wireless power receiver 300, receives, decrypts and interprets the data from the secondary wireless power receiver 300 and respond with suitable encrypted data to the secondary wireless power receiver 300 in the identified wireless power protocol. The dual mode wireless power receiver 100 passes the received data along with a completion code to the software application or mobile device operating system on receiving an end of service (eos) message or the timeout of a predetermined duration of power transmission time.

For example, in scenarios such as purchasing an item from a vending machine, purchasing a newspaper, purchasing bus tickets, using a travel-pass, withdrawing money from an automated teller machine (ATM), a two-way authentication is preferred between the secondary wireless power receiver 300 and the dual mode wireless power receiver 100. The higher level software applications in both the secondary wireless power receiver 300 and the dual mode wireless power receiver 100 drive the mutual authentication process. The dual mode wireless power receiver 100 authenticates the secondary wireless power receiver 300 to ensure the veracity of the machine placed in public domain. The power drawn from the dual mode wireless power receiver 100 by the secondary wireless power receiver 300 is only for two-way communication. As a result, the power drain on the dual mode wireless power receiver 100 is minimal.

Figure 4D:
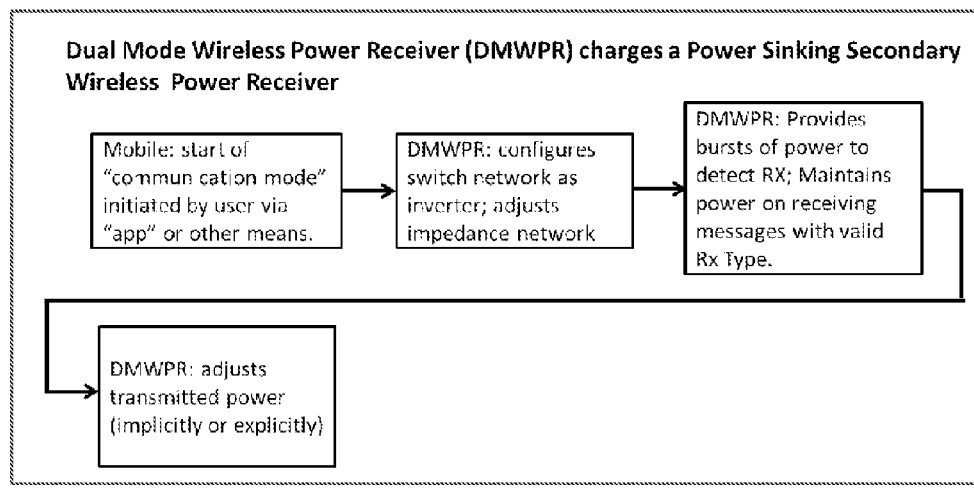

FIG. 4D exemplarily illustrates a flow diagram showing the operation of the dual mode wireless power receiver 100 in communication with a power sinking secondary wireless power receiver 300. The power from the dual mode wireless power receiver 100 is used for communication and for other internal needs of the secondary wireless power receiver 300 such as for example, charging a battery or powering a motor in the secondary wireless power receiver 300. Consider an example, where a first mobile device, containing a dual mode wireless power receiver 100 provides wireless power to charge a second mobile device's battery, the second mobile device containing a secondary wireless power receiver 300. The dual mode wireless power receiver 100 enters "communication mode" and provides power when instructed by a software application that is resident and executing on a mobile device of the dual mode wireless power receiver 100, a hardware switch on a mobile device of the dual mode wireless power receiver 100 that is externally toggled, etc. In communication mode, the first circuitry of the dual mode wireless power receiver 100 is configured to change the impedance of the impedance network 101 and change the topology of the switch network 102 to transmit a part of the stored power to the secondary wireless power receiver 300 to power-up the secondary wireless power receiver 300. The stored power is, for example, contained in a battery, a capacitor, etc., and is provided to the dual mode wireless power receiver 100 by a power management integrated circuit (PMIC). The PMIC provides a steady input voltage (VBat) to the dual mode wireless power receiver 100 while the battery is being discharged. This input voltage (VBat) provided by the PMIC to dual mode wireless power receiver 100 is typically higher than the battery's output voltage as the battery's output voltage level may not be conducive for effective wireless power transmission.

On receiving sufficient level of power, the secondary wireless power receiver 300 powers up and starts communicating. When a communication message is received, the dual mode wireless power receiver 100 identifies that the secondary wireless power receiver 300 is a power sinking secondary wireless power receiver type. The dual mode wireless power receiver 100 also identifies the wireless power protocol of the secondary wireless power receiver 300. An authentication process is generally not requested by the power sinking secondary wireless power receiver 300. When power is received from the dual mode wireless power receiver 100, the secondary wireless power receiver 300 communicates and provides feedback to perform a function associated with the transmitted power. The dual mode wireless power receiver 100 takes action as per the wireless power protocol for such a type of secondary wireless power receiver 300. The functions performed by the dual mode wireless power receiver 100 may include one of increase the transmitted power, decrease the transmitted power, maintain the transmitted power, turnoff the transmitted power, etc. As the stored power of the dual mode wireless power receiver 100 is used to power up the power sinking secondary wireless power receiver 300 for communication and for its internal needs such as for example, charging a battery or powering a motor in the secondary wireless power receiver 300, the stored power in the dual mode wireless power receiver 100 drains at a much faster pace than with the other types of the secondary wireless power receivers.

Figure 5A:
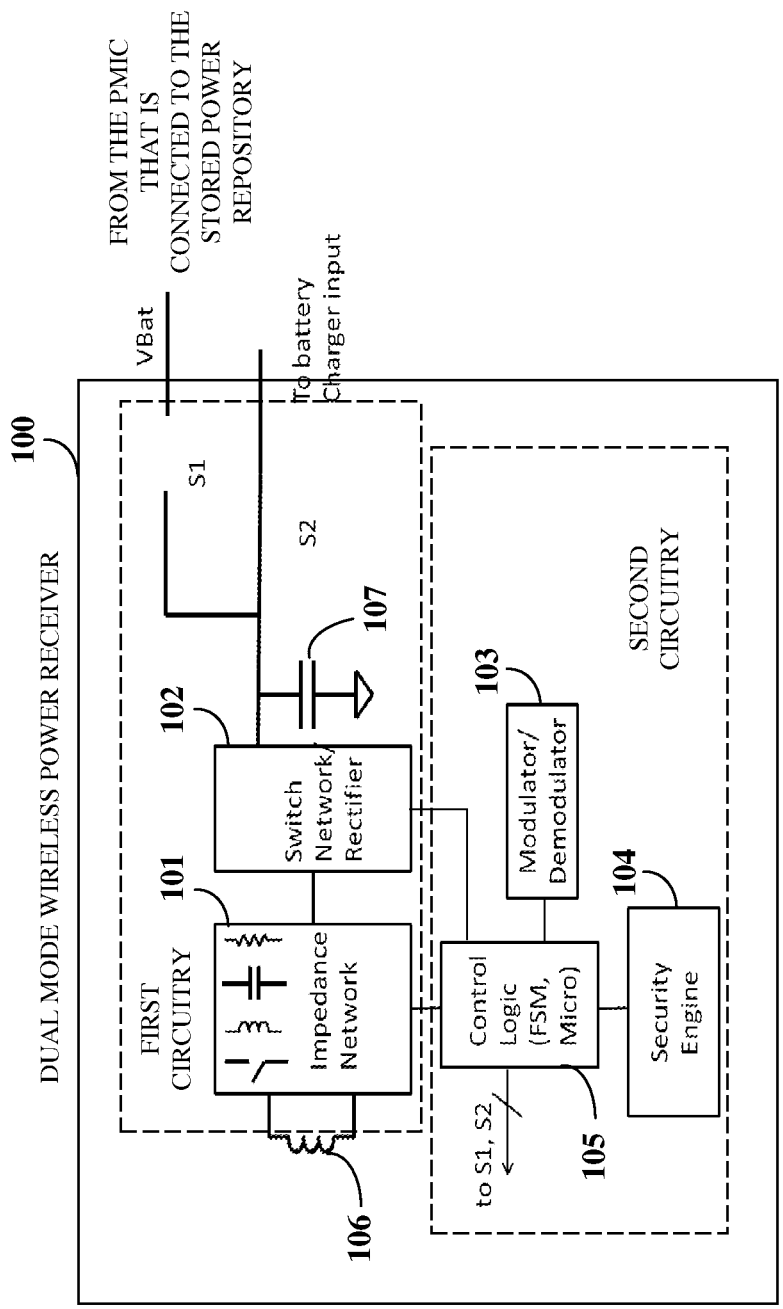
FIG. 5A exemplarily illustrates a schematic diagram of the dual mode wireless power receiver in the charging mode.

FIG. 5A exemplarily illustrates a schematic diagram of the dual mode wireless power receiver 100 in the charging mode. The dual mode wireless power receiver 100 as exemplarily illustrated in the detailed description of FIG. 1 configures the switch network 102 of the first circuitry, as a rectifier in the charging mode. In the charging mode, a S2 switch is closed and a S1 switch is open. The configuration of S2 switch and S1 switch drives to deliver power from the external wireless power transmitter 200 exemplarily illustrated in FIG. 2A, to the dual mode wireless power receiver 100.

Figure 5B:
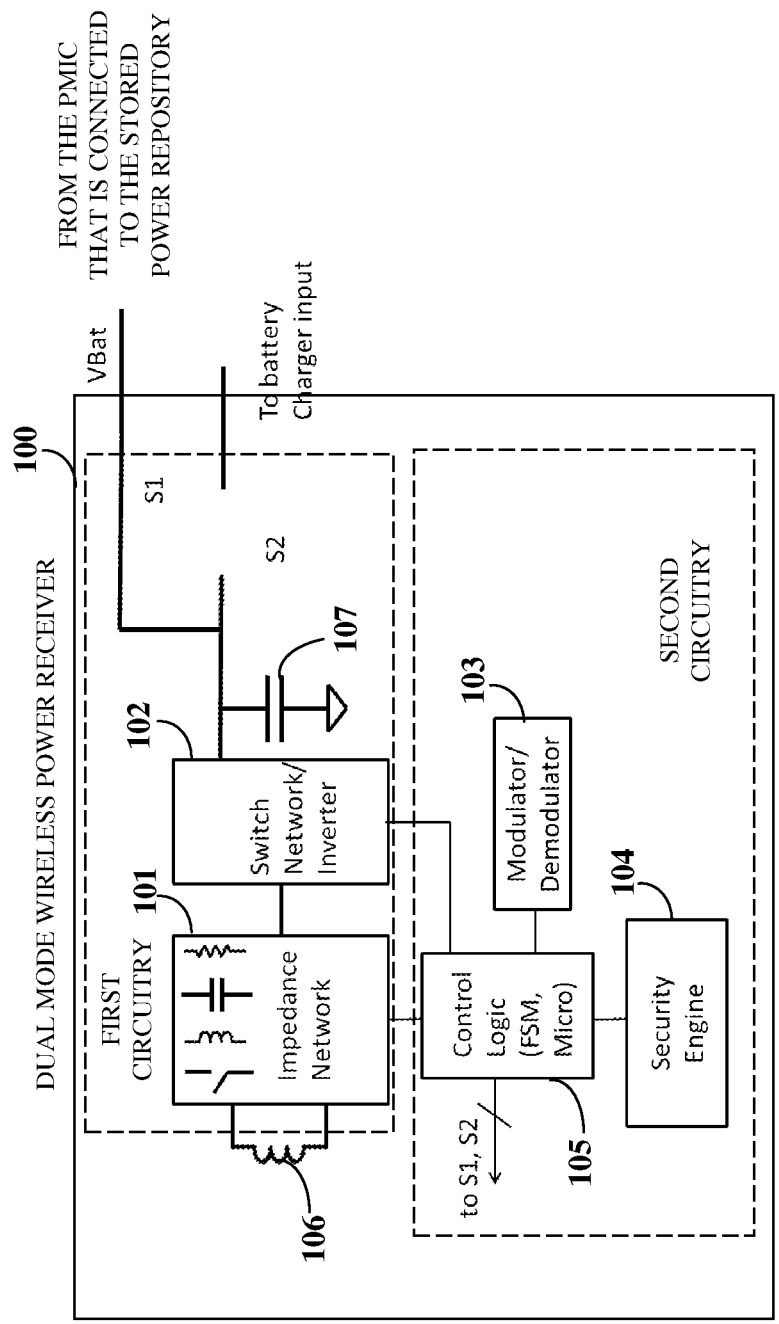
FIG. 5B exemplarily illustrates a schematic diagram of the dual mode wireless power receiver in the communication mode.

FIG. 5B exemplarily illustrates a schematic diagram of the dual mode wireless power receiver 100 in the communication mode. The dual mode wireless power receiver 100 as exemplarily illustrated in the detailed description of FIG. 1 configures the switch network 102 of the first circuitry, as an inverter in the communication mode. In the communication mode, a S1 switch is closed and a S2 switch is open. The configuration of S2 switch and S1 switch drives to deliver power from the dual mode wireless power receiver 100 to the secondary wireless power receiver 300 exemplarily illustrated in FIG. 3.

Figure 6A:
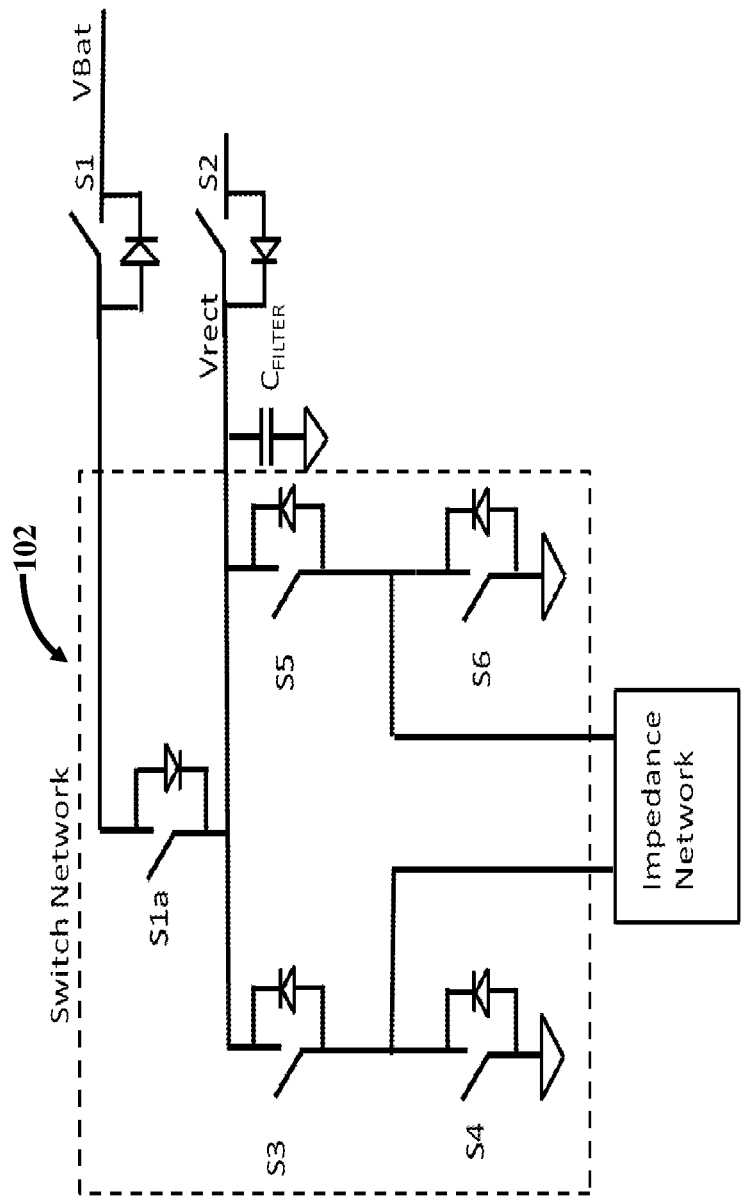
FIG. 6A exemplarily illustrates a switch network of the dual mode wireless power receiver.

FIG. 6A exemplarily illustrates the switch network 102 of the dual mode wireless power receiver 100 exemplarily illustrated in FIG. 1. The switch network 102 comprises switches S1a, S3, S4, S5, and S6. The switch network 102 is configured as an inverter or a rectifier depending on the mode of operation of the dual mode wireless power receiver 100.

Figure 6B:
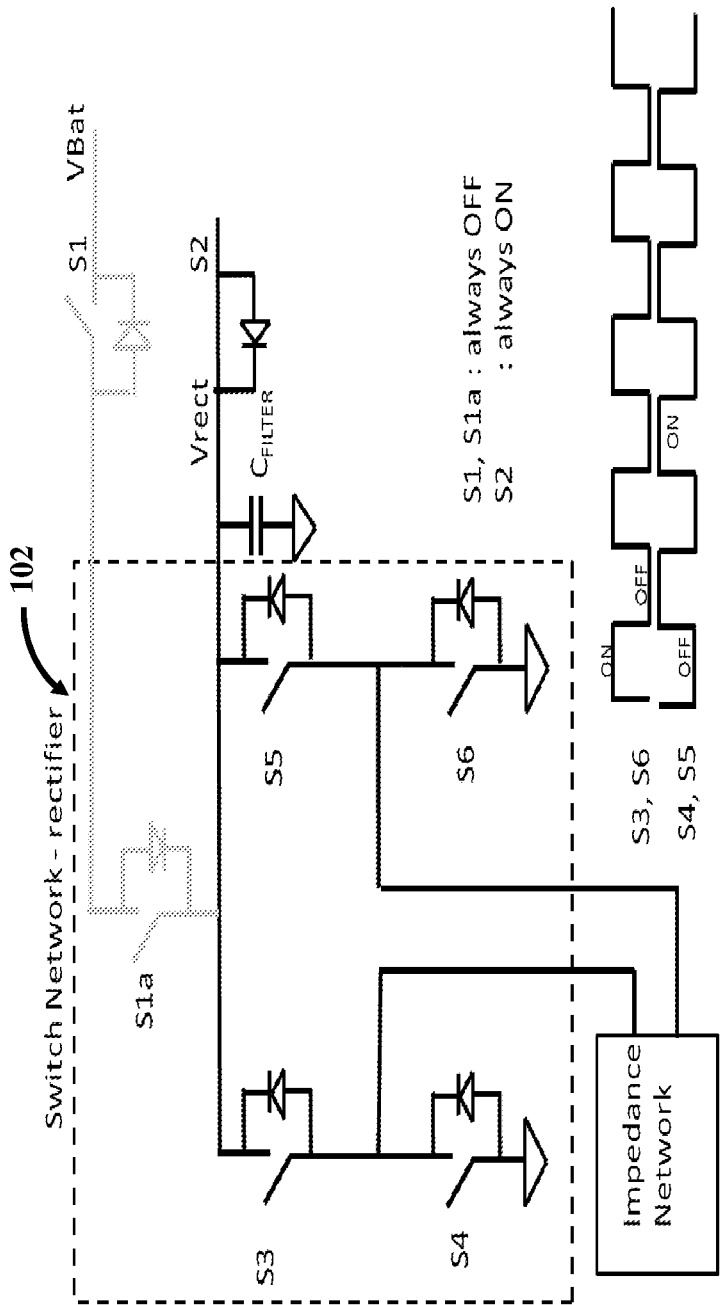
FIG. 6B exemplarily illustrates an embodiment of the switch network of the dual mode wireless power receiver in the charging mode.

FIG. 6B exemplarily illustrates an embodiment of the switch network 102 of the dual mode wireless power receiver 100 exemplarily illustrated in FIG. 2A, in the charging mode. The switch network 102 as exemplarily illustrated in FIG. 6B is configured as a full wave rectifier, for example, a full synchronous full wave rectifier. The power management integrated circuit (PMIC) adapts and provides stored power to the switch network 102 but in charging mode, that input power path is disconnected from the switch network 102 by configuring switch S1a the switch network 102 in an off state. During charging mode, switch S1 which is external to the switch network 102 is also configured in an off state to ensure that power does not flow into the switch network 102 from that input power path via the substrate body diodes of switch S1a. Switches S3, S4, S5, and S6 are driven with the timing relationship as exemplarily illustrated in FIG. 6B in full synchronous full wave rectification mode. In an embodiment, switches S3, S4, S5, and S6 are driven in half synchronous full wave rectification mode. In another embodiment, switches S3, S4, S5, and S6 are kept off in charging mode and full wave rectification happens through the substrate body diodes of switches S3, S4, S5, and S6. When a power contract is established between the external wireless power transmitter 200 exemplarily illustrated in FIG. 2A and the dual mode wireless power receiver 100, switch S2 which is external to the switch network 102 is configured in an on state to deliver power to the load device.

Figure 7A:
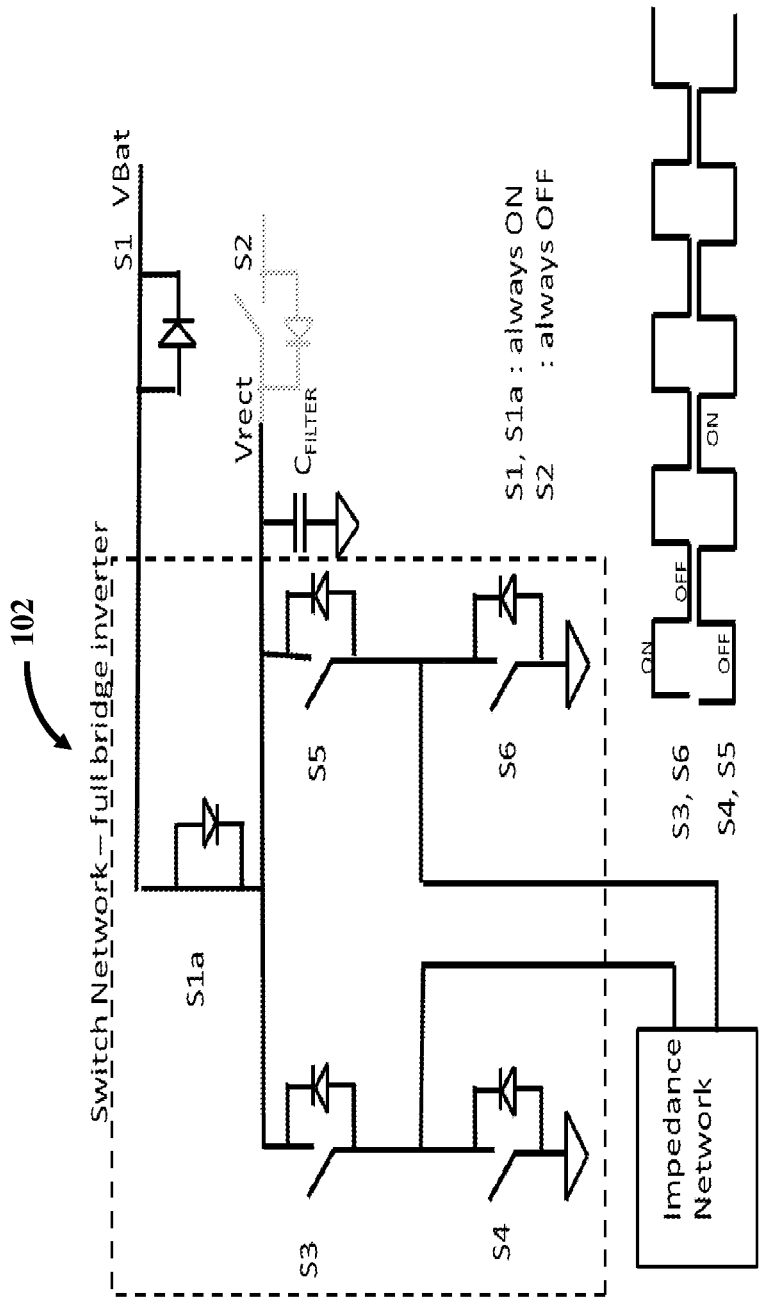
FIG. 7A exemplarily illustrates a first embodiment of the switch network of the dual mode wireless power receiver in the communication mode.

FIG. 7A exemplarily illustrates a first embodiment of the switch network 102 of the dual mode wireless power receiver 100 exemplarily illustrated in FIG. 3, in the communication mode. In the communication mode, the switch network 102 can be configured as a full bridge inverter by keeping switch S1a in an on state and driving switches S3, S4, S5, and S6 as per the timing relationship exemplarily illustrated in FIG. 7A. As exemplarily illustrated by the timing relationship waveform in FIG. 7A, switches S3 and S6 are driven on when the switches S4 and S5 are driven off and vice versa. In communication mode, switch S2 which is external to the switch network 102 is configured in an off state to ensure that the stored power is not recirculated as that would be very wasteful. Switch S1 which is external to the switch network 102 is configured in an on state to enable the switch network 102 to draw stored power via the power management integrated circuit (PMIC).

Figure 7B:
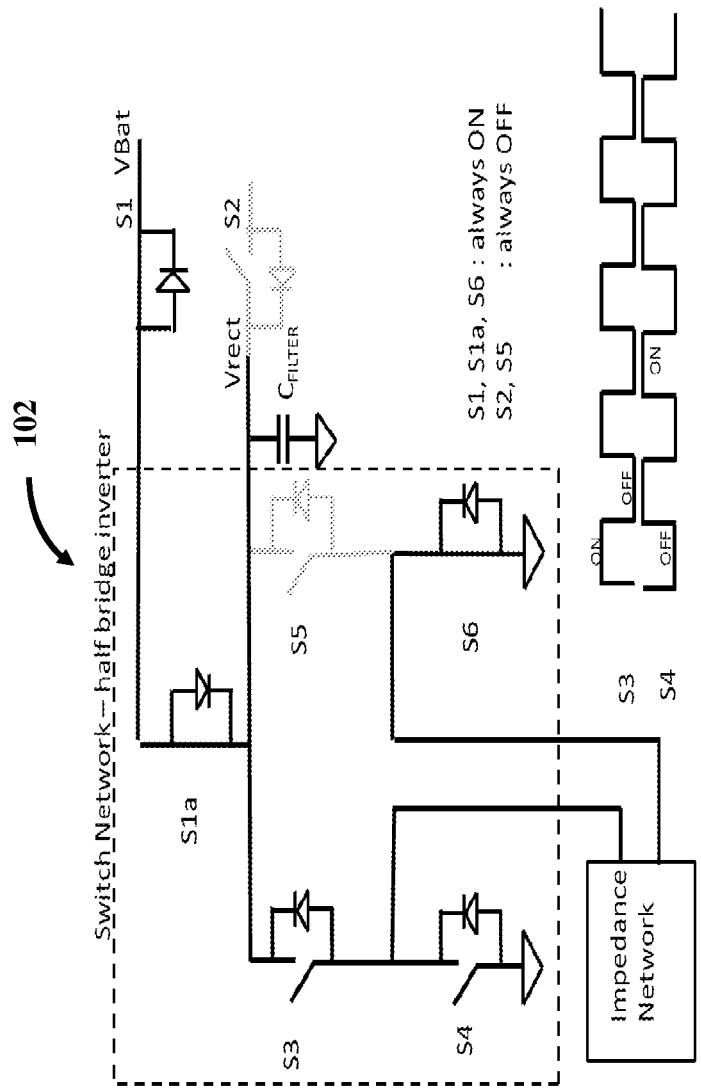
FIG. 7B exemplarily illustrates a second embodiment of the switch network of the dual mode wireless power receiver in the communication mode.

FIG. 7B exemplarily illustrates a second embodiment of the switch network 102 of the dual mode wireless power receiver 100 exemplarily illustrated in FIG. 3, in the communication mode. The switch network 102 is configured as half bridge inverter by keeping switch S5 in an off state and switches S1a and S6 in an on state. Switches S3 and S4 are driven with the timing relationship exemplarily illustrated in FIG. 7B. Alternatively the switch network 102 can be configured as a half bridge inverter by keeping switch S3 in an off state and switches S1a and S4 in an on state. Switches S5 and S6 would be driven analogous to the timing relationship exemplarily illustrated in FIG. 7B with S5 substituting for S3 and S6 substituting for S4. In both these embodiments, switch S2 which is external to the switch network 102 is configured in an off state to ensure that the stored power is not recirculated as that would be very wasteful. Switch S1 which is external to the switch network 102 is configured in an on state to enable the switch network 102 to draw stored power via the power management integrated circuit (PMIC).

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A dual mode wireless power receiver configured to selectively apply a received power to a load device and utilize at least a part of a stored power to power-up and communicate with a secondary wireless power receiver to cause an action or a transaction or charge a load device of said secondary wireless power receiver, said dual mode wireless power receiver comprising:
    a first circuitry comprising:
        one of a coil and capacitor electrodes;
        an impedance network;
        a switch network;
        a filter capacitor; and
        one or more switches;
    a second circuitry comprising:
        a security engine configured to authenticate, decrypt, and encrypt a data transfer between said dual mode wireless power receiver and said secondary wireless power receiver;
        a control logic circuit; and
        a modulator/demodulator circuit;
    said first circuitry configured to receive said power from a wireless power transmitter;
    said first circuitry, based on an input from said control logic circuit, configured to change impedance of said impedance network and topology of said switch network to obtain a modified form of said received power, and apply said modified form of said received power to said load device;
    said first circuitry, based on an input from said control logic circuit, configured to change said topology of said switch network and said impedance of said impedance network to transmit at least part of said stored power to said secondary wireless power receiver to power-up said secondary wireless power receiver;
    said second circuitry configured to identify a type of said secondary wireless power receiver and identify a wireless power protocol of said secondary wireless power receiver; and
    said second circuitry, on power-up of said secondary wireless power receiver, configured to perform one of:
        receiving and interpreting data from said secondary wireless power receiver in said identified wireless power protocol;
        providing authentication information to said secondary wireless power receiver to authenticate said dual mode wireless power receiver, receive and interpret said data from said secondary wireless power receiver, and respond with suitable encrypted data to said secondary wireless power receiver in said identified wireless power protocol;
        initiating exchange of said authentication information between said dual mode wireless power receiver and said secondary wireless power receiver, to authenticate said dual mode wireless power receiver and said secondary wireless power receiver, receive, decrypt, and interpret said data from said secondary wireless power receiver and respond with said encrypted data to said secondary wireless power receiver in said identified wireless power protocol; and
        receiving and interpreting a request from said secondary wireless power receiver and performing a function associated with said transmitted power in conjunction with said first circuitry.

2. The dual mode wireless power receiver of claim 1, wherein said first circuitry is configured as one of an inverter and a rectifier.

3. A method for a dual mode wireless power receiver for communicating and receiving power from a wireless power transmitter and for delivering power and exchanging information with a secondary wireless power receiver to cause one of an action, a transaction and charging a load device of said secondary wireless power receiver, said method comprising:
    providing said dual mode wireless power receiver comprising:
        a first circuitry comprising an impedance network, a switch network, a filter capacitor, one of a coil and capacitor electrodes, and one or more switches; and
        a second circuitry, said second circuitry comprising a security engine and a modulator/demodulator circuit;
    configuring said first circuitry to receive said power from said wireless power transmitter;
    configuring said first circuitry to change impedance of said impedance network and topology of said switch network to obtain a modified form of said received power and apply said modified form of said received power to said load device;
    configuring said first circuitry to change said impedance of said impedance network and said topology of said switch network to transmit at least part of a stored power to said secondary wireless power receiver to power-up said secondary wireless power receiver;

configuring said second circuitry to identify a type of said secondary wireless power receiver and a wireless power protocol of said secondary wireless power receiver;

configuring said security engine to authenticate, decrypt, and encrypt a data transfer between said dual mode wireless power receiver and said secondary wireless power receiver via said identified wireless power protocol; and configuring said second circuitry for performing one of:
- receiving and interpreting data from said secondary wireless power receiver in said identified wireless power protocol;
- providing authentication information to said secondary wireless power receiver to authenticate said dual mode wireless power receiver, receive, decrypt, and interpret said data from said secondary wireless power receiver and respond with suitable encrypted data to said secondary wireless power receiver in said identified wireless power protocol;
- initiating exchange of said authentication information between said dual mode wireless power receiver and said secondary wireless power receiver, to authenticate said dual mode wireless power receiver and said secondary wireless power receiver, receive, decrypt, and interpret said data from said secondary wireless power receiver and respond with said encrypted data to said secondary wireless power receiver in said identified wireless power protocol; and
- receiving and interpreting a request from said secondary wireless power receiver and performing a function associated with said transmitted power in conjunction with said first circuitry.

4. The method of claim 3, further comprising configuring said first circuitry as one of an inverter and a rectifier, and adjusting said impedance of said impedance network in said first circuitry by said dual mode wireless power receiver.

5. The method of claim 3, further comprising maintaining said transmission of said power by said dual mode wireless power receiver when said second circuitry identifies said secondary wireless power receiver of being of a valid type.

6. The method of claim 3, further comprising terminating said transmission of said power by said dual mode wireless power receiver on one of receiving an end of service message and a timeout of a predetermined duration of power transmission time.

7. The method of claim 3, further comprising checking said received data for errors, terminating said transmission of said power on detection of said errors in said received data, reapplying said power, and restarting the process after a brief time delay, by said dual mode wireless power receiver.

8. The method of claim 3, further comprising passing said received data and a completion code to a software application by said dual mode wireless power receiver on said detection of one of an end of service message and a timeout of a predetermined duration of power transmission time.

9. The method of claim 3, further comprising passing said received data and a completion code to a device operating system by said dual mode wireless power receiver on said detection of one of an end of service message and a timeout of a predetermined duration of power transmission time.

10. The method of claim 3, further comprising initiating said power to said secondary wireless power receiver by said dual mode wireless power receiver on command by a user through a hardware switch.

11. The method of claim 3, further comprising initiating said power to said secondary wireless power receiver by said dual mode wireless power receiver on command by a user through a software application.

\* \* \* \* \*